Figure 1:
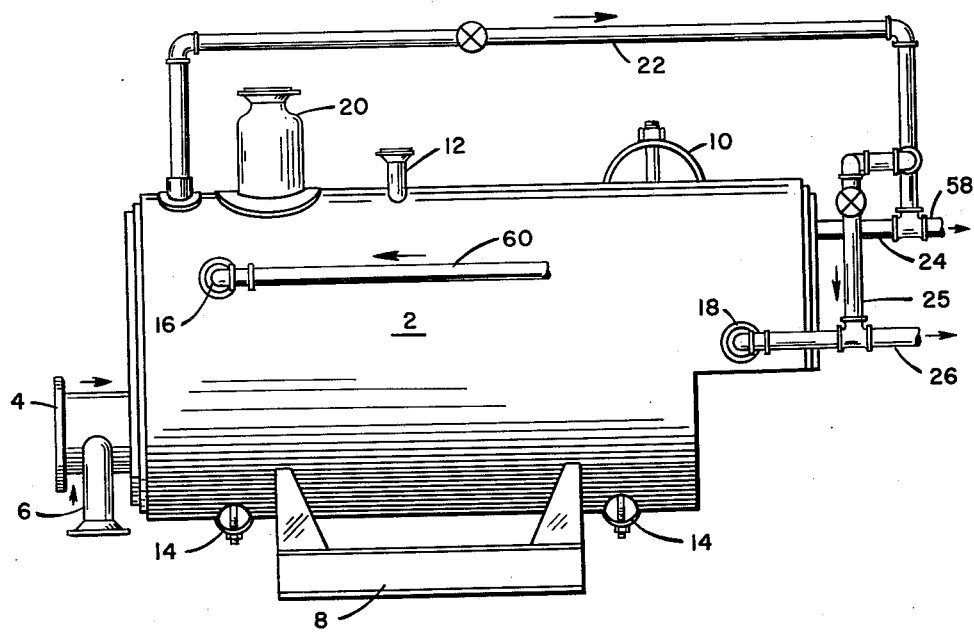

INVENTORS
HOWARD GREKEL
KAROL L. HUJSAK
BY Arthur McShay
ATTORNEY

INVENTORS
HOWARD GREKEL
KAROL L. HUJSAK
BY
ATTORNEY

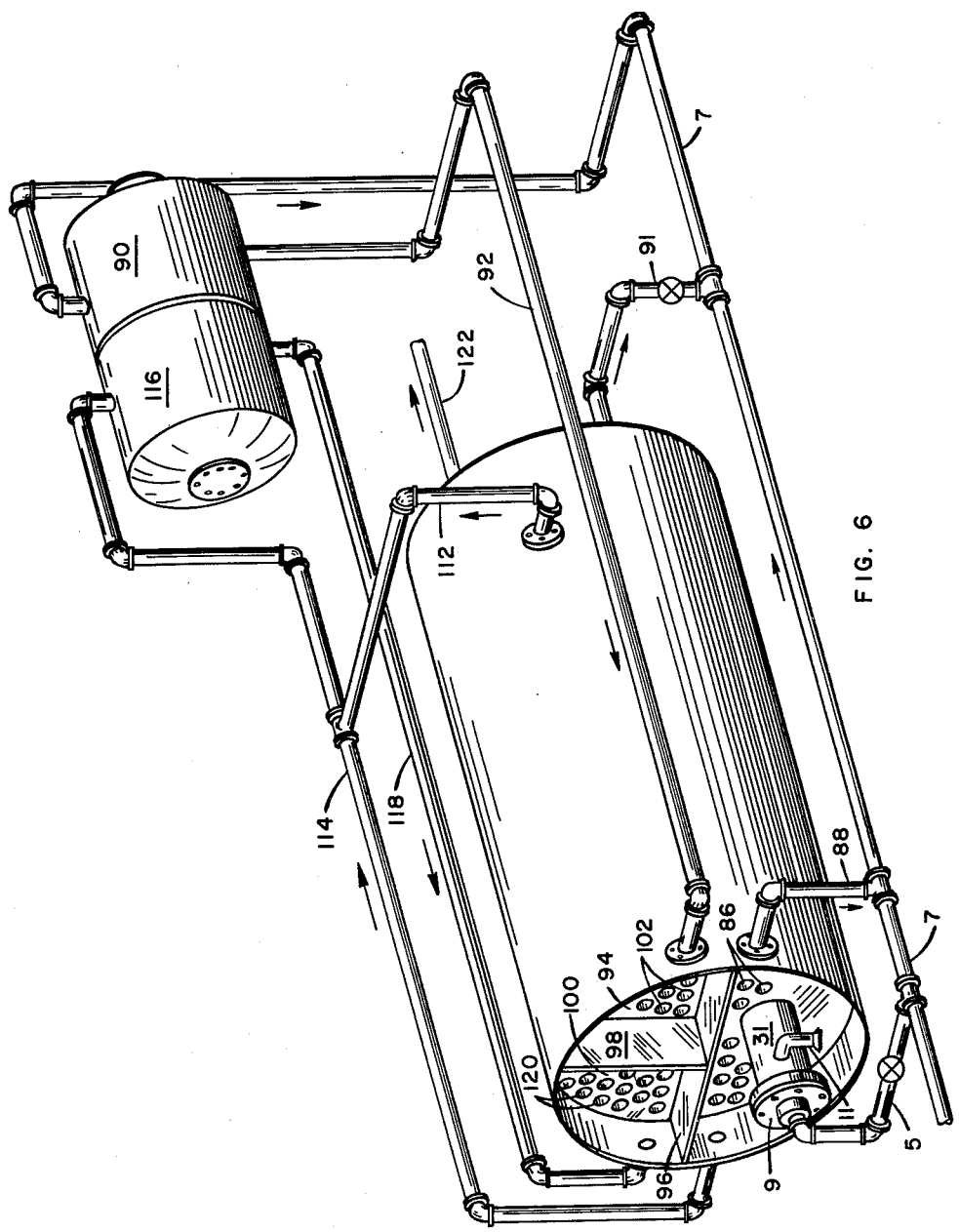

INVENTORS
HOWARD GREKEL
KAROL L. HUJSAK
BY
ATTORNEY

United States Patent Office 3,057,698
Patented Oct. 9, 1962

3,057,698
SULFUR RECOVERY APPARATUS
Howard Grekel and Karol L. Hujsak, Tulsa, Okla., assignors to Pan American Petroleum Corporation, Tulsa, Okla., a corporation of Delaware
Filed Dec. 4, 1958, Ser. No. 778,203
3 Claims. (Cl. 23—262)

The present invention relates to the recovery of sulfur from hydrogen sulfide-containing gases. More particularly, it is concerned with novel equipment design which makes possible the construction of a highly efficient and compact sulfur recovery plant. Specifically, this invention is directed to a novel boiler having not only boiler and sulfur condensing sections therein, but also means therein for separating product sulfur from gaseous components.

At present two procedures are employed commercially for the recovery of free sulfur from sour gas streams. In one type of operation all of the feed is introduced into a boiler together with sufficient air or other source of free oxygen to oxidize one-third of the hydrogen sulfide in the feed to sulfur dioxide. As the mixture of hot gases is cooled in the furnace boiler which has a pressure-tight case, some sulfur is produced and is recovered. The gaseous effluent from the boiler is then adjusted to a temperature of from about 400° to 450° F. The resulting reaction mixture is then injected into a reaction zone filled with a suitable catalyst, a substantial conversion, e.g., 75 percent, of hydrogen sulfide to free sulfur obtained, the gaseous products then usually sent through an economizer or condenser and thereafter introduced into a liquid sulfur scrubbing unit. The unreacted gases taken off the scrubber overhead line are then adjusted to a temperature of from about 400° to 450° F. and sent to a second reaction zone. The products from this reactor are then led to a second scrubber to recover free sulfur therefrom.

The other well known method of recovering free sulfur from sour gas streams involves dividing the feed stream and separately burning one-third thereof to sulfur dioxide, after which the latter is combined with the remaining two-thirds of the original feed gas to give a mixture roughly equivalent to that produced when all of the gas is passed through the boiler in the manner generally described above. With a process of this sort using two converters, the method of processing the stream through the system and recovering free sulfur is substantially the same as is involved when the reaction mixture is prepared by introducing all of the feed gas into a furnace and burning one-third of said gas to sulfur dioxide. Both methods require essentially the same items of equipment, i.e., a boiler, two converters, two condensers, a gas-liquid separator for each of said condensers, two reheaters or inline burners, and a liquid sulfur storage pit. In addition to being quite costly, plants of this type require steam jacketed lines and considerable space which frequently is an important factor, particularly in crowded refinery areas.

More recently a design has been developed which is a radical departure from either of the two features mentioned above. This is described and claimed in co-pending application U.S. Serial No. 587,738, filed May 28, 1956, by Maurice Webb. The principal feature which makes this design different from the conventional type plant is that both a combustion chamber or boiler section and condensing sections are within the same shell. This eliminates not only the expense of individual condensers to handle product gas for each converter, but does away with associated piping as well. Thus, in the Webb design, all of the sour gas may pass through the furnace together with enough oxygen to convert one-third of the hydrogen sulfide to sulfur dioxide. The resulting gaseous mixture, after the free sulfur contained therein is condensed in the third pass tubes of the boiler section and removed, is taken to a converter where about 70 to 75 percent conversion of the hydrogen sulfide in the feed thereto, is secured. This product gas is next sent back to the upper portion of the boiler to a separate condenser section where the free sulfur is converted into liquid form after which the mixture of sulfur and unconverted hydrogen sulfide and sulfur dioxide is taken through flow lines to a combinaiton separation and storage vessel where the sulfur is recovered from the unreacted gases. The latter then travel through a line back toward the furnace where they are preheated by a blast of hot gas from the boiler section and this hot (about 450° F.) mixture is then sent to a second converter. The product gases thus produced travel a separate path but similar to that which the gases from the first converter followed, except that the gases remaining after the second separation step in the combination separation and storage tank, are now substantially depleted with respect to hydrogen sulfide and sulfur dioxide and are vented or flared to the atmosphere. While the Webb design has many advantages over prior methods, care must be exercised to maintain a rather narrow temperature range in the separator and storage tank at all times in order that the product sulfur can be kept in a liquid and readily flowable condition. This is for the reason that if the liquid sulfur in the barometric leg type seals in the tank becomes highly viscous or solidifies, it is necessary to go to the expense and trouble of heating the sulfur in the tank and reduce its viscosity to the desired level before operation can be resumed.

Accordingly, it is an object of our invention to provide a boiler having the advantages of those inherent in the Webb design, but possessing in addition, means within the boiler for separating condensed liquid sulfur from gaseous components and transferring the sulfur directly to a storage tank without involving separation of reactant gases outside of the boiler.

Figure 2:
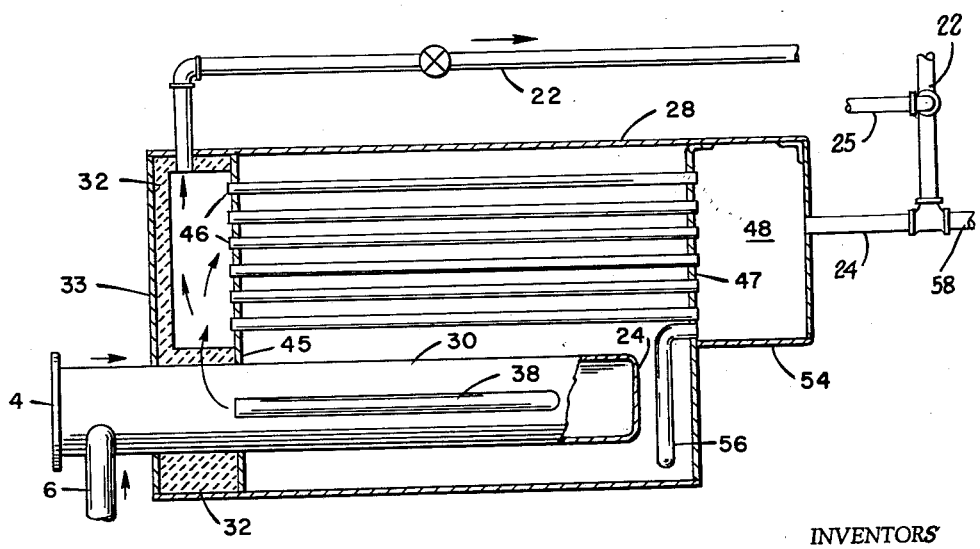
Figure 3:
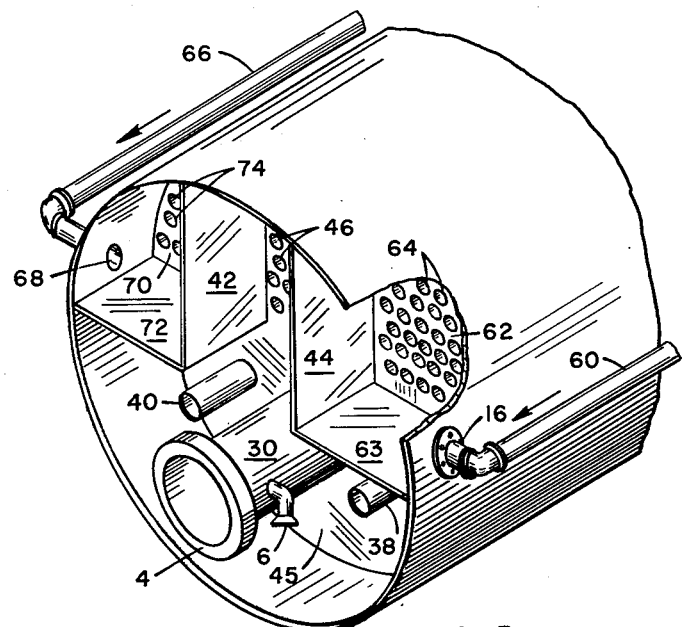
Figure 4:
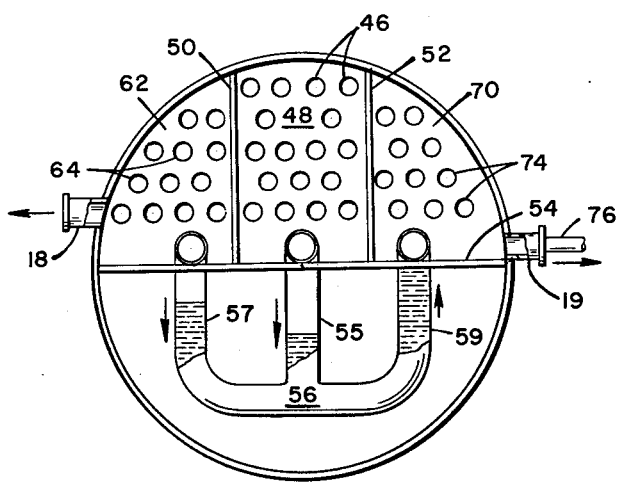
Figure 8:
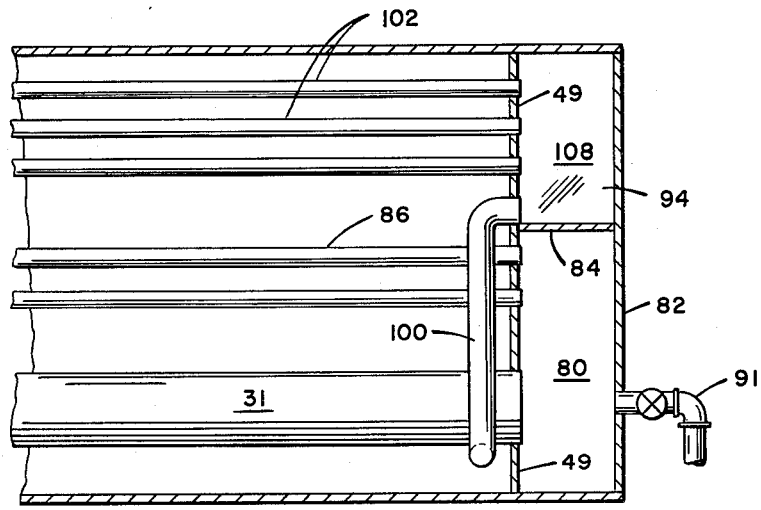
Figure 7:
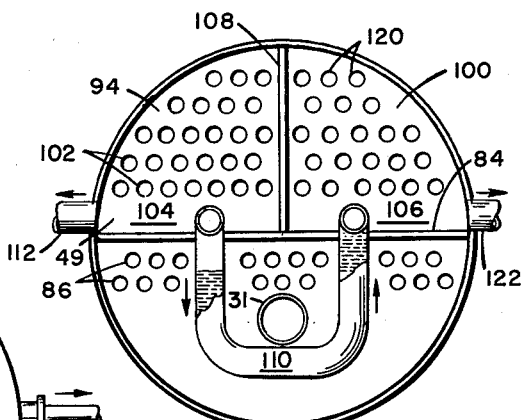
Figure 5:
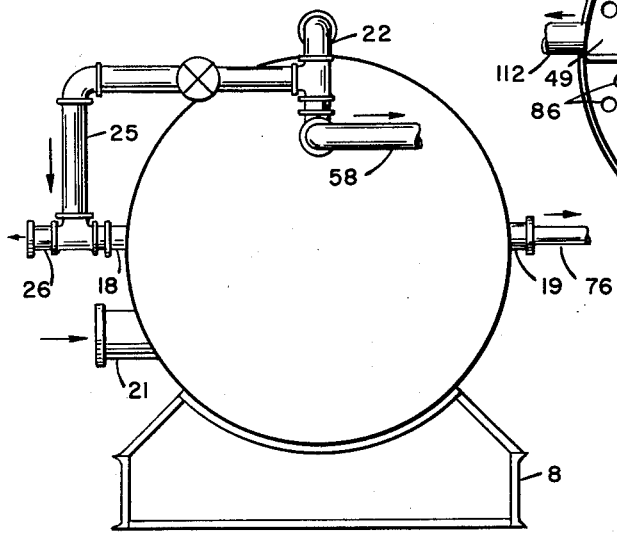

For a better understanding of our invention, there are shown different embodiments thereof in which:

FIGURE 1 is a side isometric view of our boiler;
FIGURE 2 is a vertical sectional view in elevation taken along the center of the boiler shown in FIGURE 1;
FIGURE 3 is a fragmentary isometric front end view of FIGURE 1, with the cover plate removed;
FIGURE 4 is a rear end view of FIGURE 1, with the cover plate removed, showing the manifold or transfer loop which collects condensed liquid sulfur;
FIGURE 5 is a rear end view of the boiler illustrated in FIGURE 1, with cover plate in place, showing associated piping;
FIGURE 6 is an isometric front end view, with cover plate removed, of a modified design of the boiler shown in FIGURE 1, in combination with catalytic converters and necessary flow lines;
FIGURE 7 is a rear end view of the modified boiler design of FIGURE 6, showning the transfer loop which collects condensed liquid sulfur and delivers the latter to a conduit leading to the storage tank;
FIGURE 8 is a fragmentary elevational view in section, showing the arrangement of fire and steam tubes and transfer loop employed in a boiler such as is illustrated in FIGURES 6 and 7.

Similar reference characters refer to similar parts throughout the several views of the drawings and description.

Broadly our invention contemplates use of a specially designed boiler in which substantially the lower half comprises a main fire tube and steam tubes, i.e., a boiler section. In the fire tube hydrogen sulfide is burned, producing temperatures of the order of from about 2,200° to about 2,500° F. This holds true, regardless of whether or not all of the sour gas fed to the system goes through the fire tube, or only one third of said gas is burned. The inlet and outlet ends of the boiler and condenser sections are separated by suitable fluid-tight partitions or compartments. However, the intermediate parts of the tubes making up these sections are covered by the same water. If all of the feed gas goes through the furnace, a three pass boiler design is preferred. If only a third of the gas is fed to the furnace, a two pass boiler section may be used.

In operation, a mixture of hydrogen sulfide and sulfur dioxide, in the proper proportions, is produced. This mixture, after separation of free sulfur which may condense out in the third pass tubes of the boiler, as explained in greater detail below, goes to a first converter where approximately 75 percent of the hydrogen sulfide in the feed is converted into free sulfur. This hot product gas is then returned to a condensing section of the boiler where the free sulfur is transformed into the liquid state at a temperature of about 275° F. A liquid product is collected at the effluent end of the condenser section and flows into a transfer line or loop which is submerged in the boiler water. By this arrangement it is always possible, during operation, to maintain any sulfur in the transfer loop in a mobile and readily transferable form. The sulfur flows from the first condenser via said loop, into a suitable storage tank. The level of liquid sulfur is automatically established by system pressure drop. This arrangement eliminates the need to warm up the storage tank prior to start-up after a shutdown. It also eliminates four lines between the boiler and storage vessel, as are required by the above-mentioned Webb design. In addition, the design of our invention provides a completely automatic overflow system which is always at the desired temperature during operation.

Our invention may be further illustrated with reference to one or more of FIGURES 1 to 5 of the drawings, in which 2 designates a boiler having gas inlet 4 and air inlet 6 mounted thereon. The boiler is supported by I beam 8, which in turn may rest on concrete footings not shown. A manway 10 is provided for access to the steam section of the boiler. Nozzle 12 serves as a fitting for the boiler pressure relief valves. Hand holes 14 are provided at both ends of the boiler for occasional cleaning. Entrance port 16 communicates with a first condensing section. A second entrance port on the side opposite port 16 similarly is in communication with condensing section 70. Each of these ports handles hot product gases from conventional catalytic converters. An exit port 18, for withdrawal of uncondensed gas, is located at the end of the boiler near the center and on the side thereof. A similar exit port 19 is on the opposite side of the boiler from which uncondensed gas and product sulfur are withdrawn from both condensing sections.

Steam generated in the lower and upper sections of boiler 2 is led off through steam outlet nozzle 20, at a pressure of about 40 to 50 p.s.i.a. This steam may be used for process heating or for a number of other purposes. For example, such steam may be conducted to a suitable condensing unit not shown and the resulting condensate returned to the boiler by a line 21.

A hot gas bypass line 22 extends from the front of the boiler to the rear thereof, where controlled amounts of this hot gas are used to mix with gaseous effluent in lines 24 and 26 going to the first and second converters, respectively. Mixing of this hot bypass gas brings the temperature of the hydrogen sulfide-sulfur dioxide mixture in lines 24 and 26, up to about 450° F., a suitable preheat temperature for initiating the desired reaction over bauxite catalyst.

The boiler further comprises a cylindrical shell 28 containing fire tube 30, into which acid gas and air flow through entrance ports 4 and 6, respectively. Surrounding the front portion of fire tube 30 and lining front cover plate 33, is a castable refractory material 32. Hot product gases produced in tube 30 are conducted back toward the front end of the boiler via return bend or second pass tubes 38 and 40. The gas then issues from the front end of the second pass tubes up through a channel or passageway defined by metal plates 42 and 44 leading into a set of third pass tubes 46. Tubes 46, secured to tube sheets 45 and 47, lead into a rear fluid-tight compartment 48 defined by plates 50 and 52, tube sheet 47 and divider plate 54. At the base of plate 54 is an opening into which any liquid sulfur condensing out in tubes 46 flows into leg 55 of transfer loop 56. The pressure in tubes 46 is sufficiently high to force any free sulfur formed at this stage, into leg 55 of transfer loop 56. The uncondensed gases are removed from compartment 48 via line 24, mixed with sufficient hot bypass gas in line 22 to raise the temperature of the resulting gaseous mixture to about 450° F., after which it is conducted through line 58 to a first converter, not shown. The product gases from the converter are returned via line 60 to a first condensing section 62, having tubes 64, the front end of said section being enclosed in a gas-tight compartment formed by horizontal divider plate 63 and vertical plate 44. The liquid sulfur product flows to the rear of the condenser section 62, collects on plate 54 and drains into leg 57 of loop 56. It will be noted that the relative positions of the liquid sulfur levels in legs 55 and 57 reflect the pressure drop through the system at the stage therein where gases are separated from liquid product in condensing section 62. The uncondensed gases are then taken out of the boiler through line 26, mixed with hot bypass gas from line 25 and sent to a second converter, not shown. The resulting hot product gases are then conducted back from said converter to the top of boiler 2 via line 66 and entrance port 68, where they enter a second condensing section 70 formed by horizontal divider plate 72 and vertical plate 42 and containing tubes 74. Condensed liquid sulfur then flows through tubes 74 to the rear of condensing section 70 where it combines with liquid sulfur flowing out of leg 59 and is withdrawn from the system to storage via exit port 19 and line 76.

In FIGURES 6, 7 and 8, a modified design is shown, adapted to circumstances where it is desirable to pass only one-third of the total acid gas through the boiler or furnace, for example, where the gas has a high hydrocarbon content. In instances of this sort, a two pass boiler is preferable. Thus the boiler section consists of a fire tube 31 having a gas inlet 9 and an air inlet 11. Fuel (acid gas) for fire tube 31 is supplied by line 5 from feed line 7. Hot combustion gases from fire tube 31 discharge into chamber 80 defined by tube sheet 49, cover plate 82, and horizontal divider plate 84. In the upper portion of chamber 80, are second pass tubes 86 which take hot combustion products, particularly sulfur dioxide, steam and carbon dioxide, back to the front of the boiler. The bulk of these products is then withdrawn from the boiler through line 88 and combined with the remaining two-thirds of the sour gas originally in line 7. The gas in line 7, as it enters converter 90, should be at a temperature of about 450° F. In order that more accurate temperature control of the feed to converter 90 be realized, additional hot gas, when needed, may be supplied to line 7 through valved line 91. After reaction, hot product gases at a temperature of about 750° to 850° F., are withdrawn through line 92 and sent to a first condensing section 94. The latter is formed by bisecting horizontal divider plate 96 with vertical plate 98. Plates 96 and 98 form fluid-tight seals between condensing sections 94 and 100 and between each of these sections and the portion of the front end of the boiler below horizontal plate 96.

The hot product gases introduced into condensing section 94, then pass through tubes 102 to the rear of said section where the resulting liquid sulfur and uncondensed gases discharge into fluid-tight chamber 104. The latter, as well as chamber 106, are formed by dividing horizontal plate 84 with vertical plate 108. Both of these chambers fit snugly in fluid-tight relationship with tube sheet 49. This structure divides the gas sides, only, of the rear upper and lower boiler portions. At the base of chambers 104 and 106 is a transfer tube or loop 110, which may be a U-shaped structure extending into the lower portion of the boiler. Liquid sulfur collected at the base of chamber 104 flows into transfer tube 110. The difference in levels of the two sulfur columns in the legs of tube 110 is indicative of the pressure drop occurring in the system.

Uncondensed gases are withdrawn from chamber 104 through line 112, combined with sufficient hot gas bypassed from the boiler via line 114 to give the resulting gaseous mixture a temperature of about 450° F., after which it is transferred to catalytic converter 116 where about 75 percent of the remaining hydrogen sulfide in the feed to converter 116 is transformed into free sulfur. The hot product gases are then taken from the converter through line 118, returned to condensing section 100 having tubes 120 where the resulting liquid sulfur flows into chamber 106, combined with the sulfur flowing out of transfer tube 110 and taken from the boiler via line 122 to storage.

The storage tank may be enclosed with a suitable insulating material so that the product sulfur may be maintainer in a liquid condition for an extended period of time, thereby permitting easy withdrawal therefrom. Actually, hot sulfur, which may form and line the interior of the storage tank, serves as a quite good insulating material.

It will be seen from the foregoing description that by the boiler design of our invention, problems normally encountered as the result of solidified sulfur in the lines or in the storage and separation vessel previously used, are entirely avoided. After shutdown, sulfur in the transfer tube may solidify; however, before production is resumed, the temperature of the boiler water is brought to a sufficiently high level, merely by the complete combustion of gas in the fire tube, to melt any sulfur trapped in the boiler internals. The process can then be initiated and sulfur recovered without further interruption.

We claim:

1. In an apparatus for producing elemental sulfur from a gas containing hydrogen sulfide the combination which comprises an enclosed vessel having walls and opposite ends,
    a combustion chamber in said vessel,
    means for injection of air and said gas into said chamber,
    a first series of tubes in said vessel adapted to receive gaseous products from said chamber,
    a first tube sheet extending from wall to wall of said vessel holding a portion of said chamber near the inlet end thereof and one end of said first series of tubes,
    a second tube sheet in said vessel parallel to said first tube sheet spaced apart therefrom and extending from wall to wall of said vessel and holding the other end of said first series of tubes, a second series of tubes connecting said first and second tube sheets,
    individual gas-tight compartments between said first tube sheet and the adjacent end of said vessel, one of said compartments being in direct flow communication with said first series of tubes while the remainder of said compartments are each in direct flow communication with separate groups of said second series of tubes,
    an inlet port in each of the compartments in direct flow communication with said second series of tubes,
    individual gas-tight compartments (1) between said second tube sheet and the adjacent end of said vessel, one of compartments (1) being in direct flow communication with said first series of tubes while the remainder of compartments (1) are each in direct flow communication with separate groups of said second series of tubes,
    collecting and transfer means in said vessel between said tube sheets having an opening into at least each of compartments (1) in direct flow communication with said second series of tubes, and
    means in each of compartments (1) for flow of a fluid therefrom.

2. In an apparatus for producing elemental sulfur from a gas containing hydrogen sulfide the combination which comprises an enclosed vessel having walls and opposite ends,
    a combustion chamber in said vessels,
    means for injection of air and said gas into said chamber,
    a first series of tubes in said vessel adapted to receive gaseous products from said chamber,
    a first tube sheet extending from wall to wall of said vessel holding a portion of said chamber near the inlet end thereof and one end of said first series of tubes,
    a second tube sheet in said vessel parallel to said first tube sheet spaced apart therefrom and extending from wall to wall of said vessel and holding the other end of said first series of tubes, a second series of tubes connecting said first and second tube sheets,
    individual gas-tight compartments between said first tube sheet and the adjacent end of said vessel, one of said compartments being in direct flow communication with said first series of tubes while the remainder of said compartments are each in direct flow communication with separate groups of said second series of tubes,
    an inlet port in each of the compartments in direct flow communication with said second series of tubes,
    individual gas-tight compartments (1) between said second tube sheet and the adjacent end of said vessel, one of compartments (1) being in direct flow communication with said first series of tubes while the remainder of compartments (1) are each in direct flow communication with separate groups of said second series of tubes,
    collecting and transfer means in said vessel between said tube sheets having an opening into each of compartments (1), and
    means in each of compartments (1) for the flow of a fluid therefrom.

3. In an apparatus for producing elemental sulfur from a gas containing a hydrogen sulfide the combination which comprises an enclosed vessel having walls and opposite ends,
    a combustion chamber in said vessel,
    means for injection of air and said gas into said chamber,
    a first series of tubes in said vessel adapted to receive gaseous products from said chamber,
    a first tube sheet extending from wall to wall of said vessel holding a portion of said chamber near the inlet end thereof and one end of said first series of tubes,
    a second tube sheet in said vessel parallel to said first tube sheet spaced apart therefrom and extending from wall to wall of said vessel and holding the other end of said first series of tubes, a second series of tubes connecting said first and second tube sheets,
    individual gas-tight compartments between said first tube sheet and the adjacent end of said vessel, one of said compartments being in direct flow communication with said first series of tubes while the remainder of said compartments are each in direct flow communication with separate groups of said second series of tubes,
    a port in each of said gas-tight compartments, means at the end adjacent said first tube sheet for removing from said vessel gaseous products formed in said chamber, individual gas-tight compartments (1) between said second tube sheet and the adjacent end of said vessel, one of compartments (1) being in direct flow communication with said first series of tubes while the remainder of compartments (1) are each in direct communication with separate groups of said second series of tubes, collecting and transfer means in said vessel between said tube sheets having an opening only in each of compartments (1) in direct flow communication with said second series of tubes, and means in each of compartments (1) for the flow of a fluid therefrom.

References Cited in the file of this patent

UNITED STATES PATENTS

| | | |
|---|---|---|
| 1,790,828 | McKnight | Feb. 3, 1931 |
| 2,589,730 | Rathkey | Mar. 18, 1952 |
| 2,834,655 | Chute et al. | May 13, 1958 |
| 2,939,769 | Webb | June 7, 1960 |

OTHER REFERENCES

Fiat Final Report 1015, Jan. 17, 1947, Oxidation of Hydrogen Sulfide to Sulfur in Claus Ovens (Gorden Cain), pages 1–9 and 3 figures.